US008694666B2

(12) United States Patent
Dixon

(10) Patent No.: US 8,694,666 B2
(45) Date of Patent: Apr. 8, 2014

(54) PERSONALIZED STREAMING DIGITAL CONTENT

(75) Inventor: Ryan Graeme Dixon, Campbell, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 12/222,998

(22) Filed: Aug. 21, 2008

(65) Prior Publication Data

US 2010/0049862 A1    Feb. 25, 2010

(51) Int. Cl.
*G06F 15/16* (2006.01)

(52) U.S. Cl.
USPC .......................................... 709/231; 709/219

(58) Field of Classification Search
USPC ........................................................ 709/231
See application file for complete search history.

(56) References Cited

U.S. PATENT DOCUMENTS

| | | | |
|---|---|---|---|
| 6,662,231 B1 * | 12/2003 | Drosset et al. ................ | 709/229 |
| 2002/0116476 A1 * | 8/2002 | Eyal et al. .................... | 709/219 |
| 2002/0152278 A1 * | 10/2002 | Pontenzone et al. .......... | 709/217 |
| 2003/0018966 A1 * | 1/2003 | Cook et al. ........................ | 725/2 |
| 2004/0133657 A1 * | 7/2004 | Smith et al. ................... | 709/219 |
| 2004/0230440 A1 * | 11/2004 | Malhotra ......................... | 705/1 |
| 2006/0195516 A1 * | 8/2006 | Beaupre ........................ | 709/203 |
| 2006/0195902 A1 * | 8/2006 | King et al. ..................... | 726/21 |
| 2006/0212444 A1 * | 9/2006 | Handman et al. ................. | 707/5 |
| 2007/0073596 A1 * | 3/2007 | Alexander et al. ............. | 705/26 |
| 2007/0089174 A1 * | 4/2007 | Bader et al. ..................... | 726/32 |
| 2007/0124776 A1 * | 5/2007 | Welk et al. .................... | 725/75 |

OTHER PUBLICATIONS

Conrad, Tom, Welcome to the Music Genome Project, May 2, 2006, http://blog.pandora.com/pandora/archives/2006/05/welcome_to_the.html.*

* cited by examiner

*Primary Examiner* — Liangche A Wang
*Assistant Examiner* — Sherman Lin
(74) *Attorney, Agent, or Firm* — Novak Druce Connolly Bove + Quigg LLP

(57) ABSTRACT

A method for generating personalized streaming content, the method including the steps of analyzing a digital library of a user associated with a user account, generating recommended digital media based on analysis of the digital library, generating personalized streaming content that includes digital media from the digital library and recommended digital media.

24 Claims, 5 Drawing Sheets

Stream Block Types — 200

| P = Purchased | R = Recommended | A = Advertisements |
|---|---|---|
| 205 | 210 | 215 |

FIG. 2

PERSONALIZED STREAMING DIGITAL CONTENT

BACKGROUND OF THE INVENTION

1. Field of the Invention

The present invention relates to digital media, and more particularly to the personalization of streaming digital content.

2. Discussion of the Related Art

Systems for enjoying digital media, including music and video, on a personal computer (PC) or other portable device are well known in the art. For example, software allows customers to purchase music or video over the internet that is downloaded to a personal computer. Such software generally allows customers to manage music or video libraries. The software packages further allow customers to upload music and video from a personal computer to a portable device. Thus, digital music can be enjoyed on a personal computer as well as a portable media device.

Systems for enjoying digital music and video on a personal computer or other portable device generally allow users to import, into the library on a PC, CDs, DVDs, previously downloaded music and videos. In addition, users may continue to download to a PC or purchase additional digital media. Users then generate customized music or video playlists from the library suitable for any occasion. The playlists can be burned to a CD, DVD, or synched to a portable media device. Such portable media devices include portable music or portable video players.

Digital radio stations have also emerged. In digital radio stations, the user may select a genre, such as classical or country. Digital music of that genre is then streamed to the user's personal computer via an internet connection. There are many drawbacks to such digital radio stations. First, such digital radio stations do not account for the individual preferences of a particular user. For example, a particular user may like country music generally, but dislike a particular artist. Moreover the user may prefer more than one genre.

SUMMARY OF THE INVENTION

Accordingly, the present invention is directed to a method and apparatus for providing personalized streamed digital content that substantially obviates one or more problems due to limitations and disadvantages of the related art.

An object of the present invention is to provide personalized streaming digital content.

Another object of the present invention is to provide personalized streaming digital content that aims to account for the preferences of a particular user.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method and apparatus for providing personalized streamed content includes a method for generating personalized streaming content, the method including the steps of analyzing a digital library of a user associated with a user account, generating recommended digital media based on analysis of the digital library, and generating personalized streaming content that includes digital media from the digital library and recommended digital media.

In another aspect, the method and apparatus for providing personalized streamed content includes a system for generating personalized streaming content, the system including a personal computer or portable media device, the personal computer or portable media device having a digital library, and an online store server that analyzes the digital library to identify recommended digital media and generate personalized streaming content that includes digital media from the digital library and recommended digital media, wherein the personalized streaming content is streamed to the personal computer or portable media device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 2 illustrates exemplary block types of digital media according to the present invention;

DETAILED DESCRIPTION OF THE EMBODIMENTS

Reference will now be made in detail to the embodiments of the present invention, examples of which are illustrated in the accompanying drawings.

Figure 1:
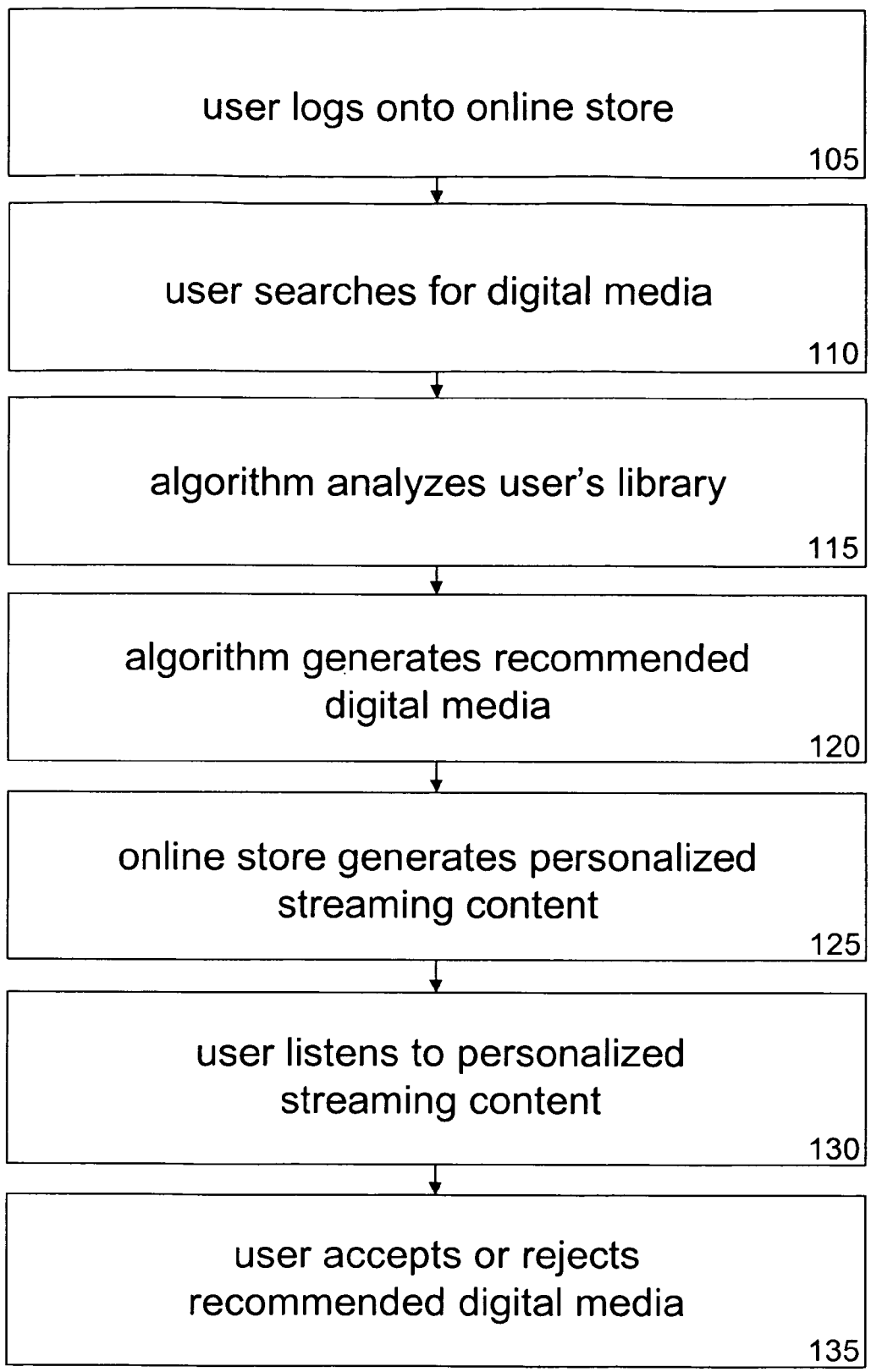
FIG. 1 illustrates an exemplary method for generating personalized streaming digital content according to the present invention.

FIG. 1 illustrates an exemplary method for generating personalized streaming digital content. At step 105, a user logs onto an online store for digital media. The online store may require that a user have a login name and login password. The login name and login password may then be used to identify individual users such that each user has an online account. By identifying individual users, the online store may identify trends in a user's activities while logged onto the online store to offer more personalized services.

At step 110, a user may search for desired digital media. Upon locating the desired digital media, the user may choose to preview the desired digital media prior to purchasing. The user may then decide whether to purchase the desired digital media. Once the digital media is purchased, it becomes a part of the user's library on the user's personal computer, and may also be stored on a portable media device.

Next, at step 115, the present invention's system uses an algorithm that analyzes the user's library. In evaluating the user's library, the algorithm may analyze the totality or any portion of the user's existing library, including previously downloaded digital media and digital media imported from CDs and DVDs. For example, the algorithm may analyze only digital media purchased from the online store by the user.

By associating each user with an online account, the user's purchases, library, listening and viewing habits, and searches may be stored and analyzed. Trends in the user's online purchases, library, listening and viewing habits, and searches may be identified. For example, the user may only purchase a particular genre of music, such as classical or country.

At step 120, the algorithm generates a list of digital media to be recommended to the user based on the analysis of the user performed at step 110. In this step, the totality or any portion of the user's existing library, including previously downloaded digital media, purchased online digital media, and digital media imported from CDs and DVDs, may be analyzed to generate a list of recommended digital media.

One algorithm for analyzing the user's library is the purchased algorithm. According to the purchased algorithm, digital media purchased online by the user is evaluated. The online store may track digital media purchased by individual users. Accordingly, each digital media purchased by the user is analyzed. In analyzing a particular digital media, the online store uses the purchased algorithm to identify additional digital media purchased by other consumers of the particular digital media being analyzed. For example, purchasers of Digital Media A may tend to purchase Digital Media X as well. In this case, the purchased algorithm may generate a list of digital media to be recommended to the user that would include Digital Media X.

Another algorithm for analyzing the user's library is the library algorithm. According to the library algorithm, digital media in the user's library, including previously downloaded digital media, purchased online digital media, and digital media imported from CDs and DVDs, is evaluated. According to the library algorithm, each digital media in the user's library is analyzed. In analyzing a particular digital media, the online store uses the library algorithm to identify additional digital media purchased by consumers of the particular digital media being analyzed. For example, suppose that the user has Digital Media B in the library. Purchasers of Digital Media B may tend to purchase Digital Media Y as well. In this case, the library algorithm may generate a list of digital media to be recommended to the user that would include Digital Media Y.

At step 125, the online store generates personalized streaming content. Here, the user chooses to hear or view the personalized streaming content. The personalized streaming content may include digital media already purchased online by the user, other digital media in the user's library, digital media recommended by the algorithm in step 120, and advertisements. The inclusion of advertisements in streamed content provides an opportunity for the online store to generate revenue from sources other than its users. With the recommended digital media generated at step 120, the personalized streaming content now accounts for the preferences of an individual user. In this manner, personalized streaming content can be achieved.

Digital media files may contain identifying information, such as metadata. The metadata may include varying information such as the artist, title, album, track number, and genre. The online store may employ the metadata when generating personalized streaming content. For example, by using the genre identifier in the metadata, the online store may generate streaming content that includes a particular genre. Alternatively, the online store may prompt the user to build customized personalized streaming content. In this case, the online store may allow the user to select multiple genres to compose the personalized streaming content.

At step 130, the user listens to the personalized streaming content. As discussed above, the online store may employ the metadata when generating personalized streaming content. The user may select to hear personalized streaming content that includes a particular genre, the metadata being used to identify digital media of a particular genre. Alternatively, the online store may allow the user to select a plurality of genres to be included in the personalized streaming content. In either case, the user encounters recommended digital media, and the user may either accept or reject the recommended digital media.

At step 135, the user either accepts or rejects the recommended digital media. If a recommended digital media is rejected by a user, the online store will no longer provide that particular digital media in personalized streaming content for that user. On the other hand, if the recommended digital media is accepted, the user may accept the digital media and purchase the digital media. If recommended digital media is accepted, the recommended digital media will remain designated as recommended digital media. Alternatively, the online store may designate the recommended digital media as "still recommended" digital media. The online store may stream still recommended digital media for a limited number of times to a user. For example, if a recommended digital media is accepted, but not purchased, the online store may only stream that still recommended digital media one more time. Once recommended digital media or still recommended digital media is purchased, the designation of the recommended digital media will change to purchased digital media, and the purchased digital media will become a part of the user's library.

FIG. 2 illustrates exemplary block types of digital media. Each digital media, or digital media file, makes up a block. Stream content is then formed by a series of blocks. In generating personalized stream content, block types are used to track digital media that a user has purchased online as well as digital media that a user may be interested in purchasing, such as digital media that is recommended to a user. In particular, each block is designated a block type. For example, FIG. 2 illustrates three stream block types. Each stream block is classified as "P" for purchased, "R" for recommended, or "A" for advertisement.

The inclusion of advertisement blocks in streamed content provides an opportunity for the online store to generate revenue from sources other than its users. The A blocks included in personalized streaming content may be selected based on market research of a user's digital media preferences. For example, purchasers of Digital Media C may be likely to purchase Product A. Accordingly, manufactures of Product A may wish to purchase A blocks from the online store to be streamed to users who listen or view Digital Media C.

Other stream block types are also possible. For example, digital media downloaded by the user or imported from a CD or DVD may be classified as an "L" for library. In another example, the online store may distinguish between digital media that has been recommended to a user, R blocks, and digital media that has been accepted, but not purchased by the user. Digital media that has been accepted, but not purchased by the user may be classified as "SR" for still recommended. The online store may also identify digital media that has been rejected by the user as "X" for rejected.

The online store may store a user's preferences in a table, and access the table to generate personalized streaming content. The table may contain a list of digital media as well as the corresponding block type. In this manner, the online store is able to generate personalized streaming content that includes P blocks and R blocks, but does not include X blocks. As the user's online purchases increase and/or change, the online store is able to immediately update the table, thus allowing the personalized streaming content to be constantly modified to reflect the user's preferences.

Figure 3:
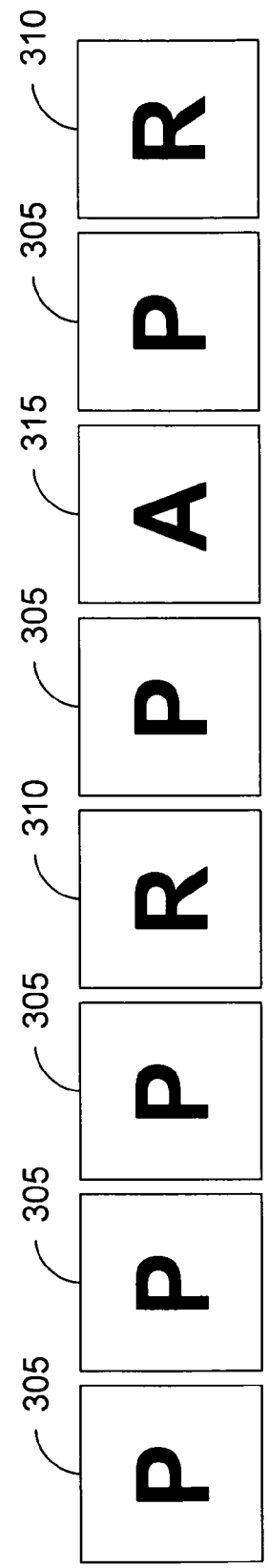
FIG. 3 illustrates exemplary personalized streaming digital content according to the present invention.

FIG. 3 illustrates an exemplary personalized streamed content. By using blocks, a streaming content station can be built to account for a user's preferences. Personalized streamed content is generated with the purchased digital media, digital media from a user's library, as well as recommended content. FIG. 3 illustrates an exemplary stream including P, R, and A blocks. As shown in FIG. 3, the R blocks 310 are dispersed among P blocks 305. The online store may employ a set of rules for streaming R blocks 310. For example, the online store may stream R blocks 310 only after streaming three P blocks 305. In another example, an R block 305 may not follow an A block 315.

Figure 4:
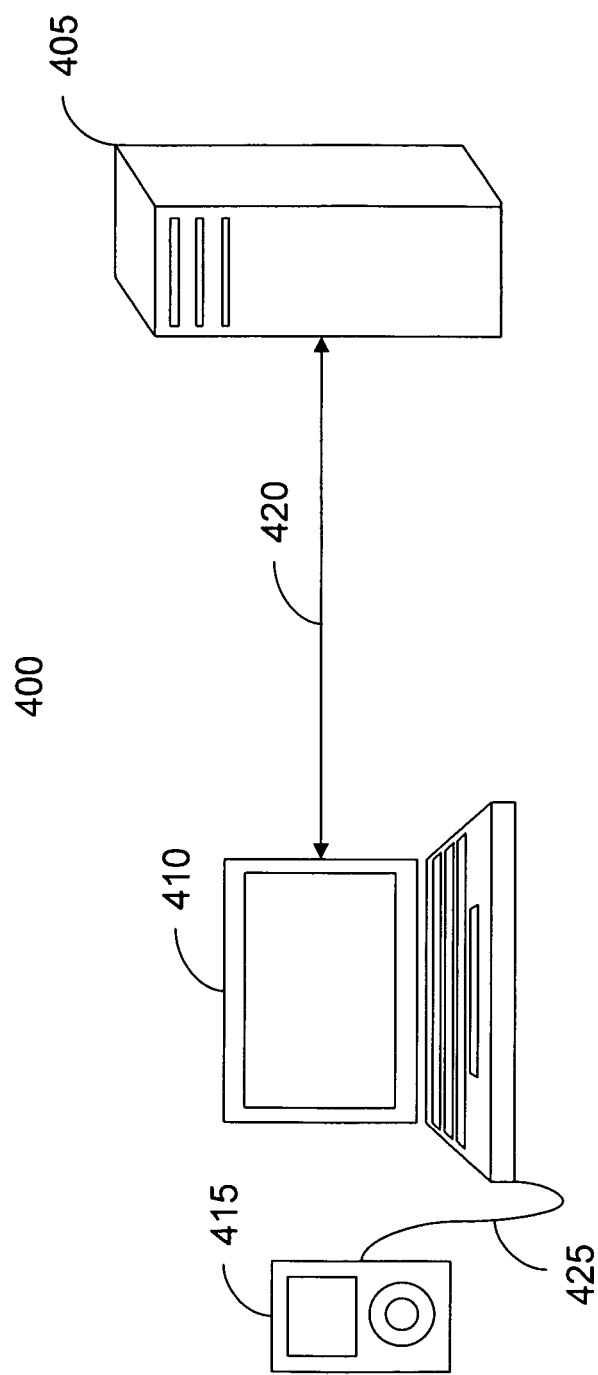
FIG. 4 illustrates an exemplary system for generating and enjoying personalized streaming digital content according to the present invention.

FIG. 4 illustrates an exemplary system for generating personalized streaming content. The system for generating personalized streaming content 400 includes an online store server 405, a personal computer 410, a portable media device 415, a network connection 420, and a local connection 425. The online store server 405 includes a processor and a memory for executing the functions of the online store and algorithms for recommending streaming content, such as the purchased algorithm and library algorithm. Each of the personal computer 410 and portable media device 415 includes a processor and a memory for managing a digital library.

The online store server 405 is connected to personal computer 410 through a network connection 420. The personal computer 410 is connected to portable media device 415 through a local connection 425. Alternatively, the portable media device 415 may be connected to the online store server without the personal computer 410 as an intermediary. In this case, the portable media device 415 may be connected to online store server 405 through network connection 420 or through a wireless connection, such as a mobile telephone network. Accordingly, a digital library may be stored on either the personal computer 410 or on the portable media device 415.

Figure 5:
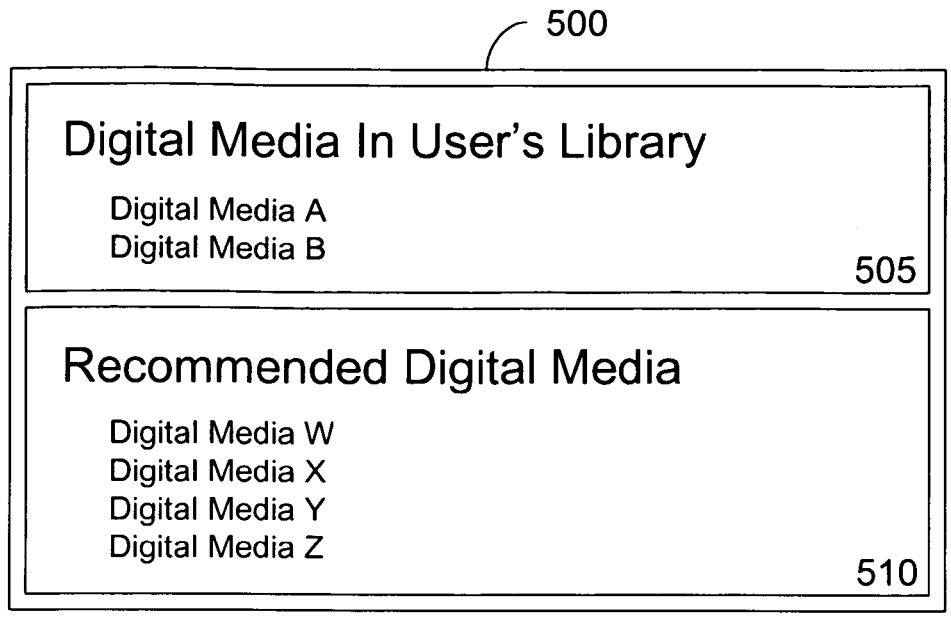
FIG. 5 illustrates an exemplary library algorithm according to the present invention.

FIG. 5 illustrates an exemplary library algorithm. According to the library algorithm 500, digital media purchased by the user 505 and other digital media in the user's library, is analyzed to generate recommended digital media 510. According to the library algorithm, a digital media in the user's library, such as Digital Media A and Digital Media B, is analyzed to identify additional digital media purchased by other consumers of the digital media, such as Digital Media W, Digital Media X, Digital Media Y, and Digital Media Z. For example, consumers of Digital Media A may have also purchased Digital Media W and Digital Media X. Similarly, consumers of Digital Media B may have also purchased Digital Media Y and Digital Media Z. In this manner, the library algorithm generates a list of digital media to be recommended to the user based on the analysis of the user's library. The library algorithm may analyze the user's purchase history as well as the user's existing digital library, including previously downloaded digital media as well as digital media imported from CDs or DVDs.

Accordingly, the library algorithm uses online purchases as well as other media in the user's library to recommend streamed content, and personalized streamed content can be achieved. The more digital media that is purchased or is already in the library, the better the collection of recommended streamed content.

Figure 6:
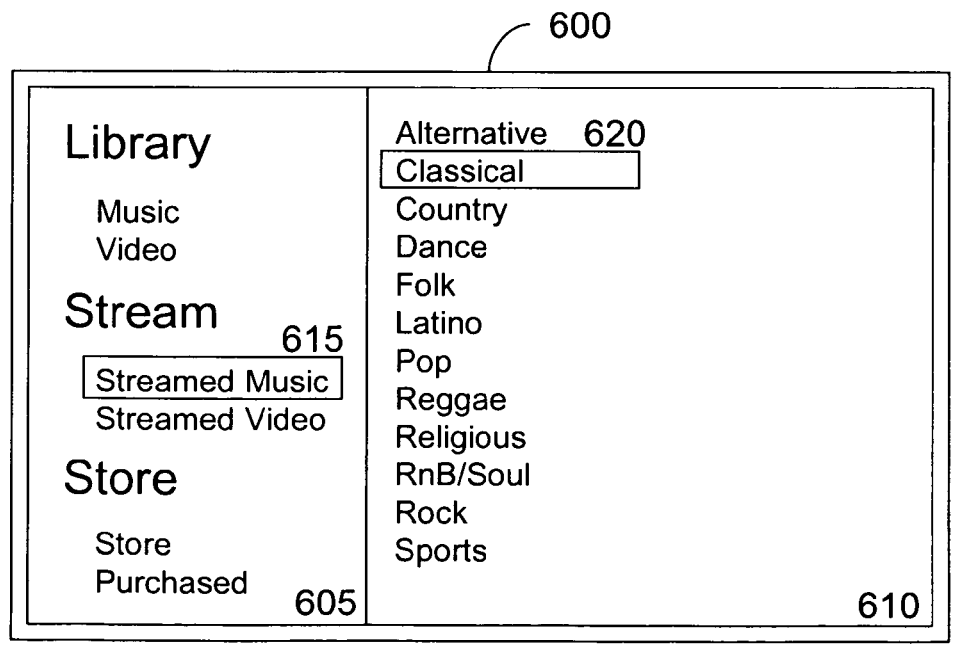
FIG. 6 illustrates an exemplary screen for selecting personalized streaming digital content according to the present invention.

FIG. 6 illustrates an exemplary screen for selecting personalized streaming content. The screen 600 includes a menu portion 605 and an interactive portion 610. The menu portion 605 includes links to the user's library, stream content, and the online store. As shown, the user may select either streamed music or streamed video. In the exemplary screen of FIG. 6, the user makes a menu selection 615 of streamed music. Upon making the menu selection 615, the interactive portion displays a corresponding interactive portion 610. When making menu selection 615 of streamed music, the interactive portion 610 may display a listing of genres such as alternative, classical, etc. The user may then make an interactive selection 620 to select the genre of music to be streamed to the user. Upon making the interactive selection 620, the user will receive personalized streamed content as described above.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A method for generating personalized streaming content, the method comprising the steps of:
   analyzing a digital library of a user associated with a user account, the digital library being stored on an electronic media device;
   generating one or more recommended digital media items based on analysis of the digital library;
   generating personalized streaming content that includes at least one of each of:
      a purchased digital media item,
      an advertisement digital media,
      a recommended media item from the one or more recommended media items,
      a still recommended media item previously recommended to the user, but not purchased by the user, and
      a downloaded media item;
   streaming the personalized steaming content to the user according to a set of rules for ordering the purchased digital media item, the advertisement digital media, the recommended media item, the still recommended media item, and the downloaded media item, wherein the set of rules is based on limiting the number of times still recommended digital media item is streamed to the user before no longer providing the still recommended digital media item in a personalized stream unless the still recommended digital media item is purchased by the user;
   prompting the user to purchase recommended digital media item that is accepted by the user; and
   designating a recommended media item as a still recommended media item if the user does not choose to purchase a recommended digital media item that is accepted by the user.

2. The method for generating personalized streaming content according to claim 1 further comprising a step of selecting one type of digital media to be streamed to the user.

3. The method for generating personalized streaming content according to claim 1 further comprising a step of selecting a plurality of types of digital media to be streamed to the user.

4. The method for generating personalized streaming content according to claim 2 wherein the type of digital media is ascertainable from identifying information of a digital media file.

5. The method for generating personalized streaming content according to claim 4 wherein the identifying information includes at least one of an artist, title, album, track number, and genre.

6. The method for generating personalized streaming content according to claim 1 wherein if the user rejects the recommended digital media item, the recommended digital media is not streamed to the user.

7. The method for generating personalized streaming content according to claim 1 wherein recommended digital media item is not streamed to the user after being streamed for the limited number of times.

8. The method for generating personalized streaming content according to claim 1 wherein the personalized streaming content is streamed to a portable digital media device.

9. The method for generating personalized streaming content according to claim 1 wherein the step of analyzing the digital library analyzes only digital media previously purchased online by the user.

10. The method for generating personalized streaming content according to claim 1 wherein the step of analyzing the digital library analyzes all digital media in the digital library.

11. The method for generating personalized streaming content according to claim 1 wherein the personalized streaming content includes advertisement streams.

12. The method for generating personalized streaming content according to claim 1 wherein the recommended digital media is not part of the digital library when the personalized streaming content is streamed.

13. A system for generating personalized streaming content, the system comprising:
   an online store server, comprising a processor, that is configured to access a digital library, the digital library being stored on an electronic device,
   the online store server being further configured, with a processor, to analyze the digital library and a purchase activity of another user from the online store server, to identify one or more recommended digital media items, and to generate personalized streaming content that includes at least one of each of:
      a purchased digital media item,
      an advertisement digital media,
      a recommended media item from the one or more recommended media items,
      a still recommended media item previously recommended to a user, but not purchased by the user, and
      a downloaded media item;
   wherein the online store server is additionally configured to stream personalized streaming content to the electronic device according to a set of rules for ordering the purchased digital media item, the advertisement digital media, the recommended media item, the still recommended media item, and the downloaded media, wherein the set of rules is based on limiting the number of times still recommended digital media item is streamed to the user before no longer providing the still recommended digital media item in a personalized stream unless the still recommended digital media item is purchased by the user; and
   wherein the online store server prompts the user to purchase recommended digital media items that are accepted by the user;
   wherein the online store server designates a recommended media item as a still recommended media item if the user does not choose to purchase a recommended digital media item that is accepted by the user.

14. The system for generating personalized streaming content according to claim 13 wherein a user may select one type of digital media to be included in the personalized streaming content.

15. The system for generating personalized streaming content according to claim 13 wherein a user may select a plurality of types of digital media to be included in the personalized streaming content.

16. The system for generating personalized streaming content according to claim 14 wherein the type of digital media is ascertainable from identifying information of a digital media file.

17. The system for generating personalized streaming content according to claim 16 wherein the identifying information includes at least one of an artist, title, album, track number, and genre.

18. The system for generating personalized streaming content according to claim 13 wherein if the user rejects the recommended digital media item, the recommended digital media item is not streamed to the user.

19. The system for generating personalized streaming content according to claim 13 wherein the recommended digital media item is not streamed to the personal computer or portable media device after being streamed for the limited number of times.

20. The system for generating personalized streaming content according to claim 13 wherein only digital media previously purchased online by a user is analyzed.

21. The system for generating personalized streaming content according to claim 13 wherein all digital media in the digital library is analyzed.

22. The system for generating personalized streaming content according to claim 13 wherein the personalized streaming content includes advertisement streams.

23. The system for generating personalized streaming content according to claim 13 wherein the recommended digital media is not part of the digital library when the personalized streaming content is streamed.

24. A method for generating personalized streaming content, the method comprising the steps of:
   analyzing a digital library of a user associated with a user account, the digital library being stored on an electronic media device;
   generating one or more recommended digital media items based on analysis of the digital library;
   generating personalized streaming content that includes at least one of each of:
      a purchased digital media item,
      an advertisement digital media,
      a recommended media item from the one or more recommended media items,
      a still recommended media item previously recommended to the user, but not purchased by the user, and
      a downloaded media item;
   streaming the personalized steaming content to the user according to a set of rules for ordering the purchased digital media item, the advertisement digital media, the recommended media item, the still recommended media item, and the downloaded media item, wherein the set of rules is based on limiting the number of times still recommended digital media item is streamed to the user before no longer providing the still recommended digital media item in a personalized stream unless the still recommended digital media item is purchased by the user;
   prompting the user to purchase recommended digital media item that is accepted by the user; and designating a recommended media item as a still recommended media item if the user does not choose to purchase a recommended dig media item that is accepted by the user.

* * * * *